US010285497B1

(12) United States Patent
Chen et al.

(10) Patent No.: US 10,285,497 B1
(45) Date of Patent: May 14, 2019

(54) ADJUSTABLE DESKTOP ASSEMBLY

(71) Applicant: CHEN-SOURCE INC., Taoyuan (TW)

(72) Inventors: Yuan-Chen Chen, Taoyuan (TW); Hsin-Hung Chen, Taoyuan (TW)

(73) Assignee: CHEN-SOURCE INC, Taoyuan (TW)

( * ) Notice: Subject to any disclaimer, the term of this patent is extended or adjusted under 35 U.S.C. 154(b) by 0 days.

(21) Appl. No.: 16/048,818

(22) Filed: Jul. 30, 2018

(51) Int. Cl.
*A47B 21/03* (2006.01)
*A47B 21/04* (2006.01)
*F16B 2/06* (2006.01)
*A47B 21/02* (2006.01)

(52) U.S. Cl.
CPC .......... *A47B 21/0314* (2013.01); *A47B 21/02* (2013.01); *A47B 21/04* (2013.01); *F16B 2/065* (2013.01); *A47B 2021/0364* (2013.01)

(58) Field of Classification Search
CPC ............. F16B 2/065; A47B 2021/0364; A47B 21/0314; A47B 21/02; A47B 21/04
See application file for complete search history.

(56) References Cited

U.S. PATENT DOCUMENTS

| | | | |
|---|---|---|---|
| 4,717,112 A * | 1/1988 | Pirkle | A47B 21/02 108/140 |
| 4,890,561 A * | 1/1990 | Hampshire | A47B 21/03 108/102 |
| 5,924,664 A * | 7/1999 | Mileos | A47B 21/0314 108/138 |
| 2004/0256524 A1* | 12/2004 | Beck | A47B 21/0314 248/146 |
| 2005/0167548 A1* | 8/2005 | Benden | A47B 21/0314 248/121 |
| 2009/0084917 A1* | 4/2009 | Hung | A47B 21/0314 248/278.1 |
| 2013/0112829 A1* | 5/2013 | Stengel | F16M 13/022 248/297.31 |
| 2015/0201747 A1* | 7/2015 | Blackburn | A47B 21/0314 108/5 |
| 2017/0013957 A1* | 1/2017 | McRorie, III | A47B 21/02 |
| 2018/0020825 A1* | 1/2018 | Hung | A47B 21/02 108/31 |

* cited by examiner

*Primary Examiner* — Hanh V Tran
(74) *Attorney, Agent, or Firm* — Muncy, Geissler, Olds & Lowe, P.C.

(57) ABSTRACT

An adjustable desktop assembly includes a base frame having two inwardly tilted sliding plates at two opposite lateral sides thereof and a mounting unit at a rear side thereof for fastened to an external support frame assembly, an adjustment mechanism including a sliding base coupled to the bottom side of the base frame and an adjustment unit, two clamping plates bilaterally mounted in the sliding base, a lead screw mounted in the adjustment unit, and a pressure block affixed to the lead screw and movable with the lead screw between a locking position where the pressure block is abutted against an abutment block of the adjustment unit to lock a desktop to the base frame and an unlocking position where the pressure block is released from the abutment block for allowing adjustment of the forward and backward position of the desktop relative to the base frame.

10 Claims, 9 Drawing Sheets

ADJUSTABLE DESKTOP ASSEMBLY

BACKGROUND OF THE INVENTION

1. Field of the Invention

The present invention relates to display screen support technology and more particularly, to an adjustable desktop assembly, which comprises a base frame, a desktop forwardly and backwardly slidably supported on the base frame, and an adjustment mechanism that uses two clamping plates to clamp inwardly tilted sliding plates of two sliding units of the base frame and a lead screw for operation to lock the desktop to the base frame or to unlock the desktop from the base frame.

2. Description of the Related Art

At present, people use tables and chairs in their daily lives (such as: home life, office, school or various workstations) for a long time. Sitting on the seat for a long period of time can cause pain in the back and neck and a drop in heart rate, metabolic rate, insulin availability and good cholesterol levels, resulting in a significant increase in the incidence of cardiovascular disease, depression and diabetes. Therefore, in order to reduce the risk of obesity and to improve metabolic problems and cardiovascular diseases, an upsurge of standing work has been set off in recent years. What's more important is that in addition to being healthy, standing work can also increase work efficiency and productivity.

Furthermore, monitors such as screens or televisions used today are very common. Due to the disadvantages of large size, poor picture quality and the ability to receive only analogue signals, the old cathode-ray-tube type screens have been replaced by light and thin liquid crystal or plasma screens that have the advantages of light, thin and clear picture characteristics and can receive analog signals as well as digital signals. However, a screen supported on a swivel monitor stand can simply be adjusted within a limited range of angles. In application, the user must pay attention to the position of the screen center of gravity in order to avoid the occurrence of dumping. Therefore, in order to meet the requirements of standing office, freely adjusting the viewing angle of the screen and reducing the desktop or workstation space and occupied by the screen, some manufacturers have developed screen support frames that can support the screen and allow the supported screen to perform a steering action. Some screen support frame designs can be mounted on a table using a mounting assembly. Some other screen support frame designs are equipped with the desktop for allowing the user to work in a standing position. Further, these prior art screen support frame designs allow free adjustment of the view angles of the screen and require less mounting space. However, after installation of a screen support frame that is equipped with the desktop, the vertical distance between the screen and the desktop is not adjustable. When a different size of screen is used and installed in the screen support frame to replace the original screen, the user may not feel appropriate when watching the screen and operating the keyboard on the desktop. Moreover, the viewing distance and habitual operating distance of different users are not always the same. If the distance between the screen and the desktop is not properly adjusted according to the size of the screen or the body type and needs of the user, it can cause the user's body or limb to display an improper posture. Therefore, the prior art screen support frame designs are less ergonomic. Improvement in this regard is necessary.

SUMMARY OF THE INVENTION

The present invention has been accomplished under the circumstances in view. It is the main object of the present invention to provide an adjustable desktop assembly, which comprises the base frame, the adjustment mechanism and the desktop. The base frame comprises two sliding units disposed at opposing left and right sides thereof and a mounting unit located on a rear side thereof for mounting to an external support frame assembly. Each sliding unit comprises the inwardly tilted sliding plate. The adjustment mechanism comprises a sliding base mounted to the base frame and slidable forwards and backwards relative to the base frame, the sliding base comprising a sliding channel slidably coupled to the base frame, two side panels respectively upwardly extended from two opposite lateral sides thereof and an adjustment unit located on one side panel and defining therein an accommodation chamber, two clamping plates bilaterally mounted in the sliding channel and adapted for clamping two sliding units of the base frame, each clamping plate comprising a clamping face for clamping on the inwardly tilted sliding plate of one respective sliding unit, one clamping plate comprising an abutment block disposed opposite to the associating clamping face and inserted into the accommodation chamber of the adjustment unit, the lead screw rotatably mounted in the adjustment unit and a pressure block fixedly mounted on the lead screw and movable with the lead screw between a locking position to hold down the abutment block and an unlocking position to release the abutment block. The desktop comprises a bottom mount fastened to the sliding base. When rotating the lead screw of the adjustment mechanism in one direction, the pressure block is moved to the locking position to force the pressure block into abutment against the abutment block, causing the clamping plates to clamp the inwardly tilted sliding plates of the sliding units of the base frame. When rotating the lead screw in the reversed direction, the pressure block is moved away from the abutment block, releasing the clamping plates from the inwardly tilted sliding plates of the sliding units of the base frame and allowing movement of the desktop to carry the sliding base forward and backward relative to the base frame. Thus, the invention achieves simple and rapid adjustment of the position of the desktop with less effort.

Further, subject to the complementary design between the inwardly tilted sliding plates of the two sliding units of the base frame and the clamping faces of the clamping plates of the adjustment mechanism, the clamping plates are supported by the inwardly tilted sliding plates horizontally as well as vertically during sliding movement of the clamping faces of the clamping plate on the respective inwardly tilted sliding plate of the sliding units of the base frame, preventing deviation of the clamping plates and keeping the desktop constantly in balance during the forward or backward adjustment procedure.

Further, an abutment surface of the abutment block and a beveled pressure surface of the pressure block are beveled, this design tolerates more wear between the abutment surface and the beveled pressure surface, prolonging the overall lifespan of the adjustable desktop assembly.

Other advantages and features of the present invention will be fully understood by reference to the following

DETAILED DESCRIPTION OF THE PREFERRED EMBODIMENT

Figure 1:
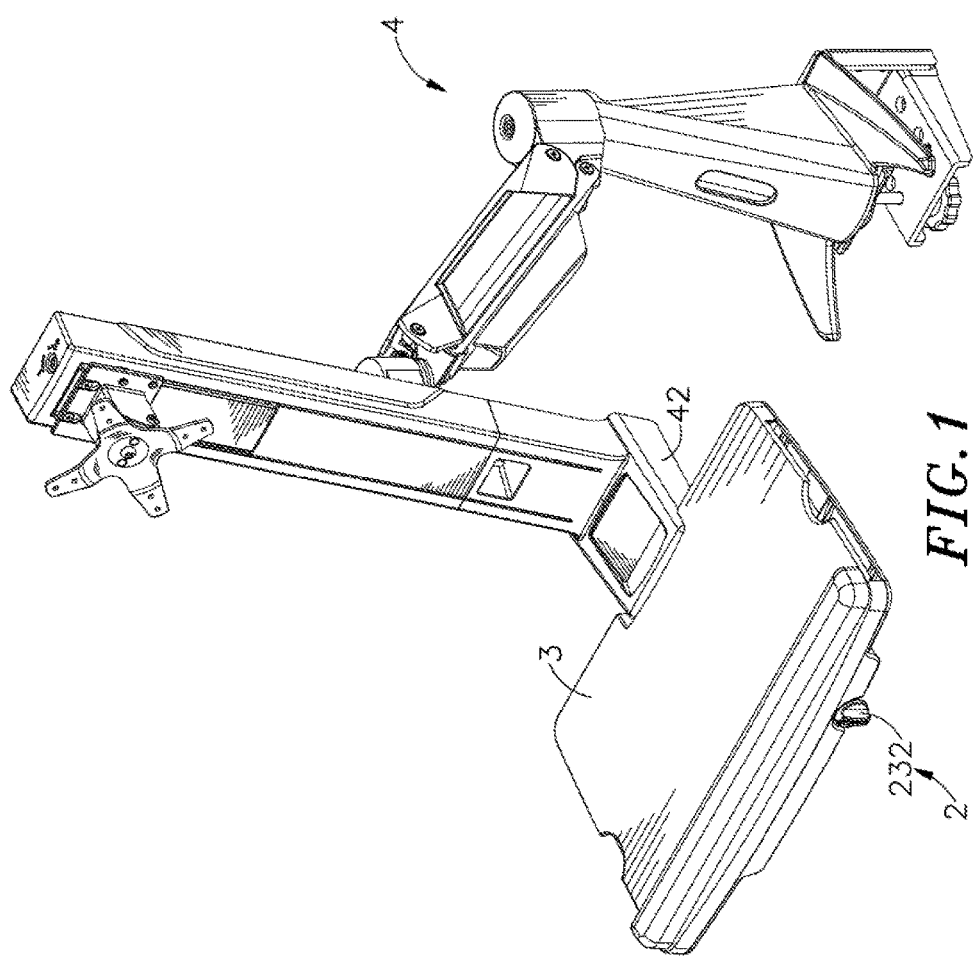
FIG. 1 is an oblique top elevational view of an adjustable desktop assembly in accordance with the present invention.
Figure 2:
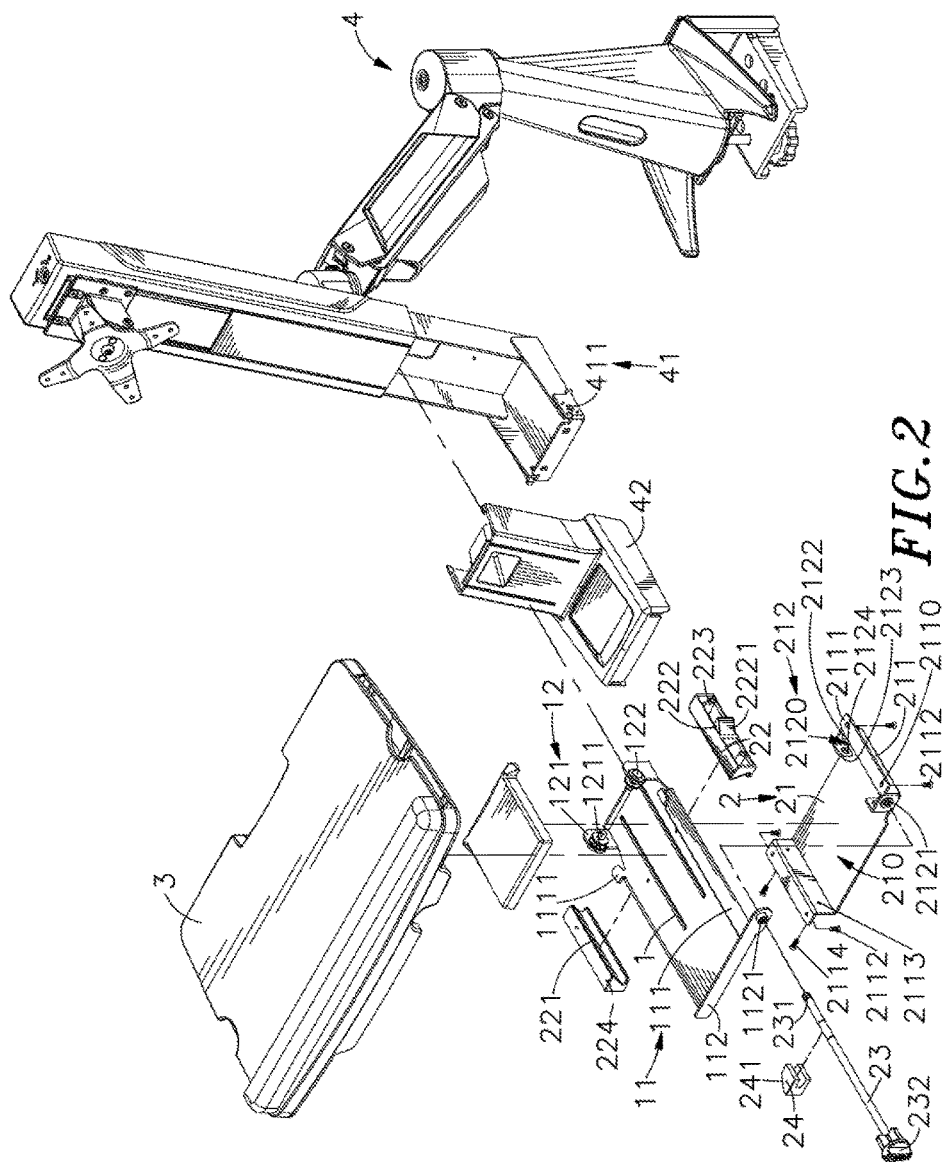
FIG. 2 is an exploded view of the adjustable desktop assembly in accordance with the present invention.
Figure 3:
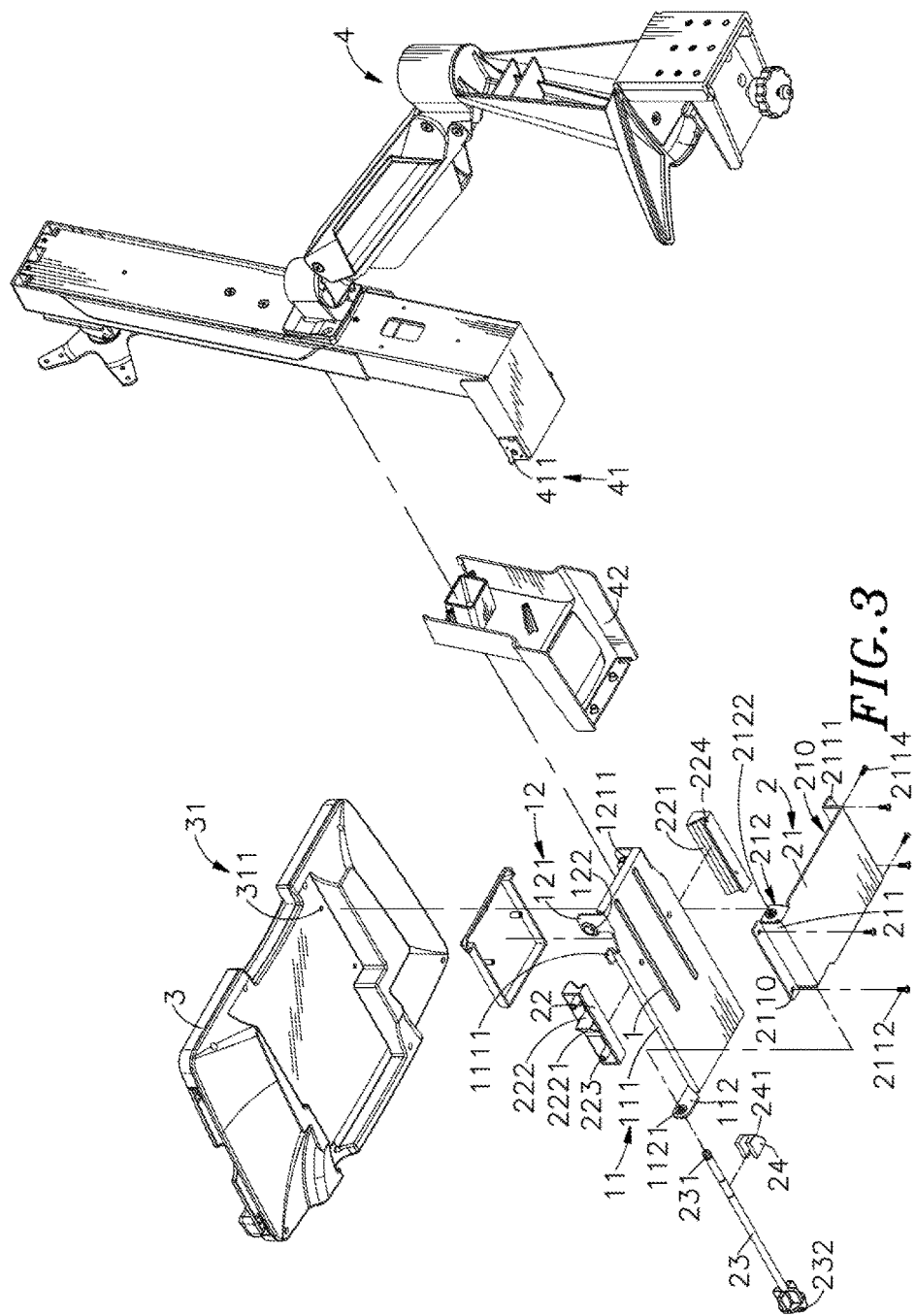
FIG. 3 corresponds to FIG. 2 when viewed from another angle.
Figure 4:
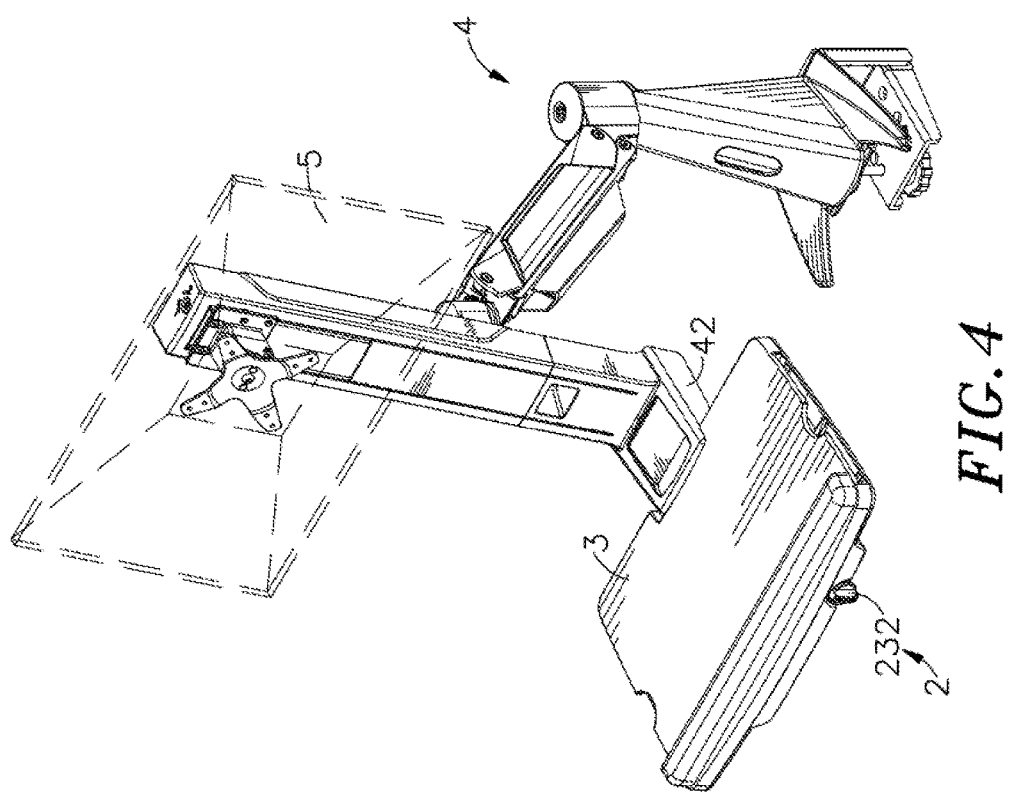
FIG. 4 is a schematic applied view of the present invention.
Figure 5:
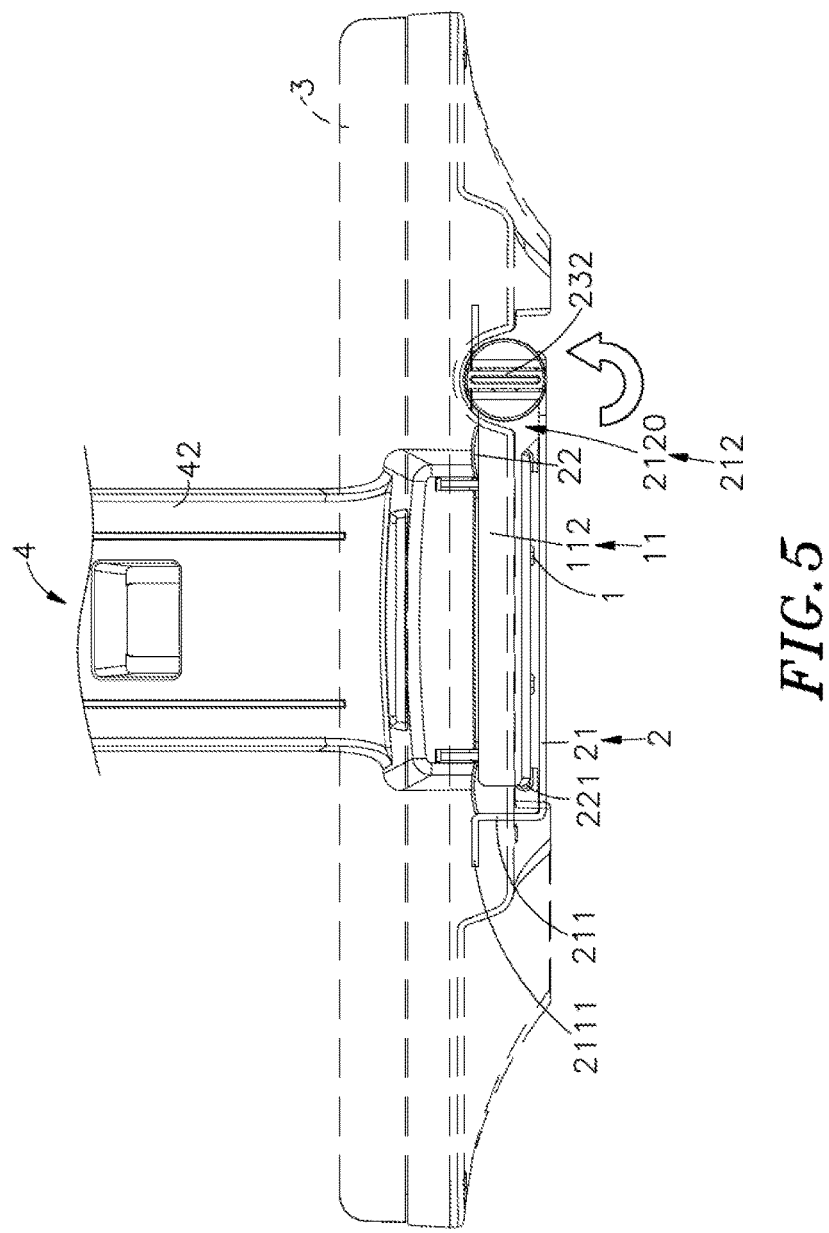
FIG. 5 is a schematic front view illustrating the lead screw rotated counter-clockwise.
Figure 6:
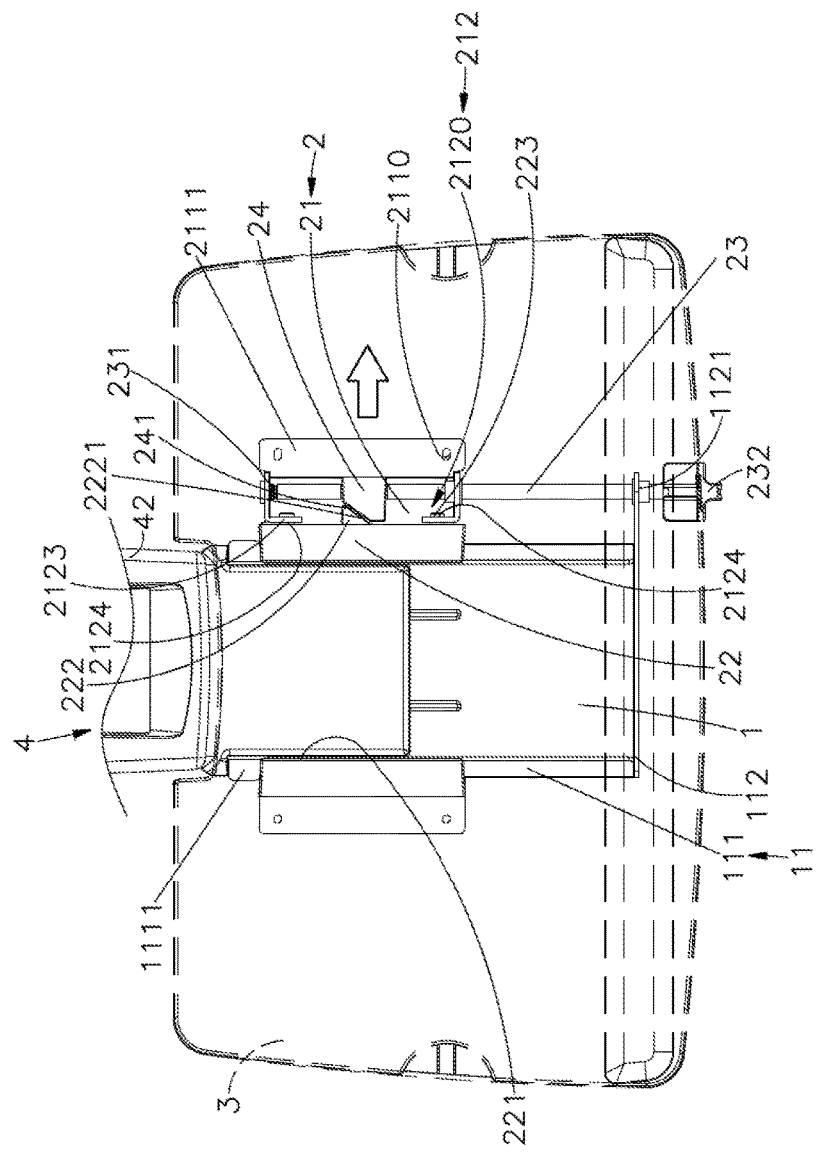
FIG. 6 is a schematic top view illustrating the pressure block released from the abutment block.
Figure 7:
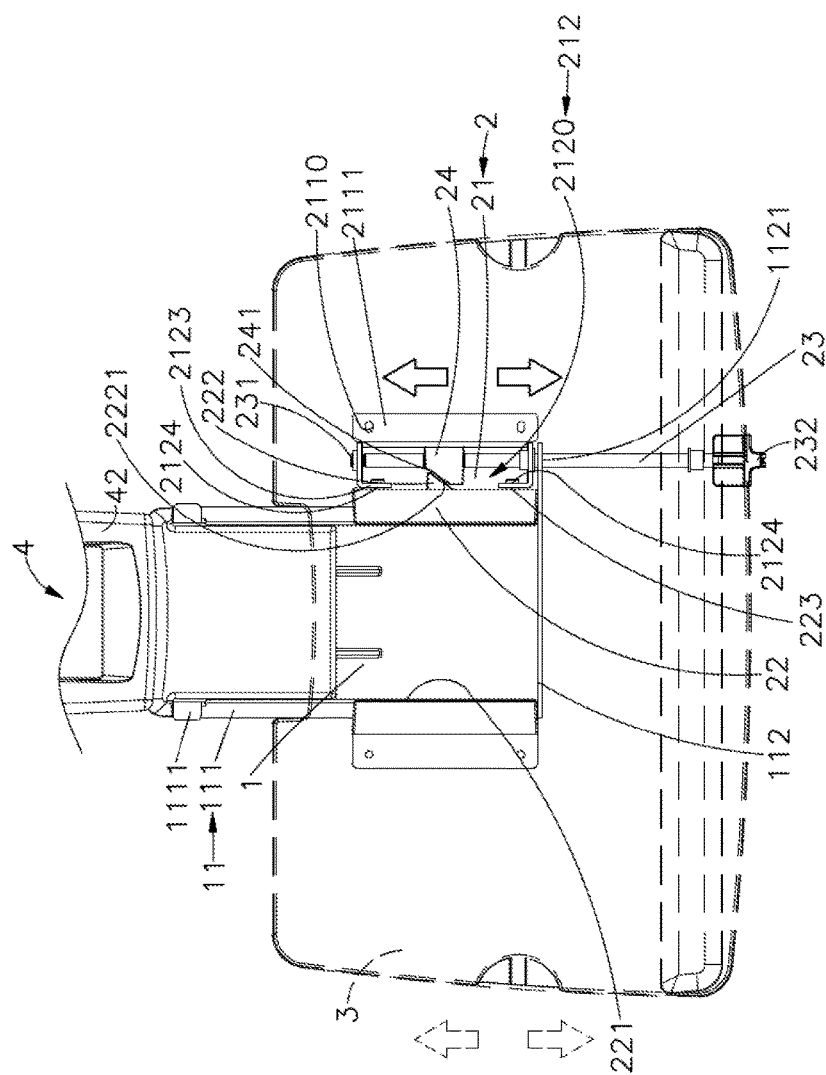
FIG. 7 is a schematic top view illustrating an adjustment of the position of the desktop.
Figure 8:
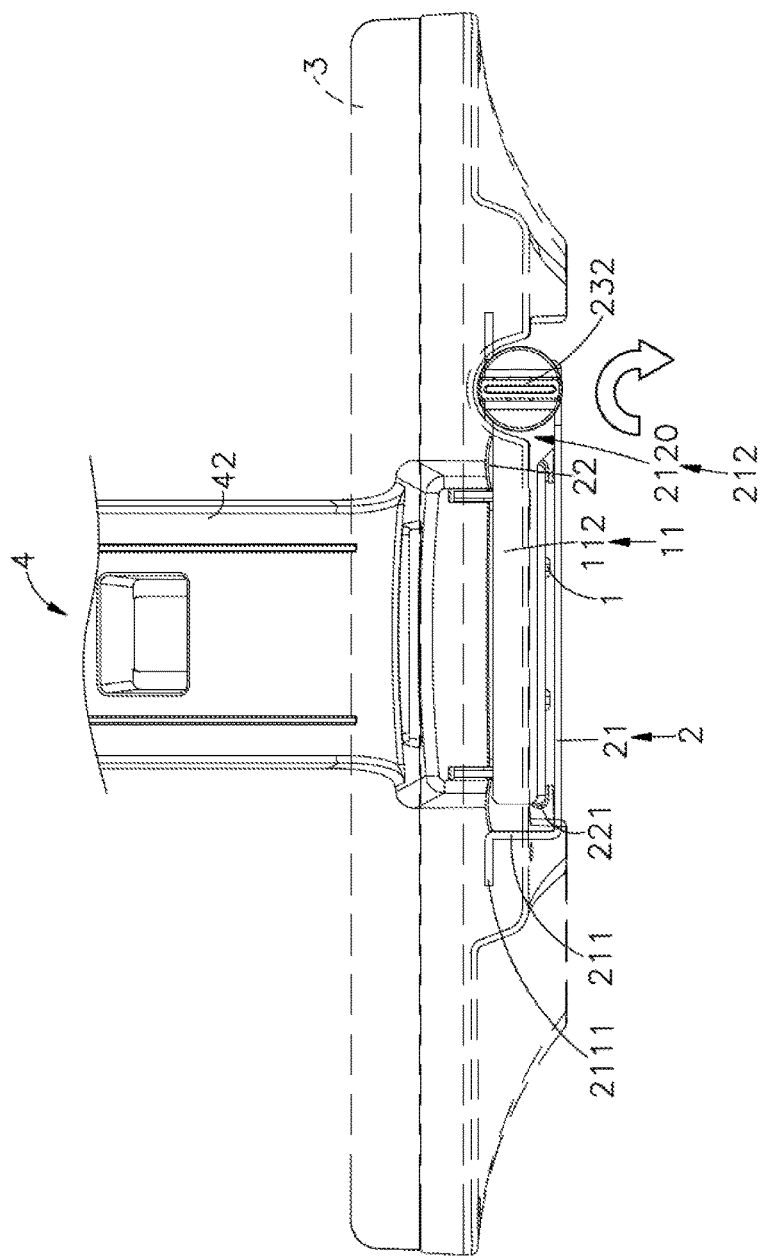
FIG. 8 is a schematic front view illustrating the lead screw rotated clockwise.
Figure 9:
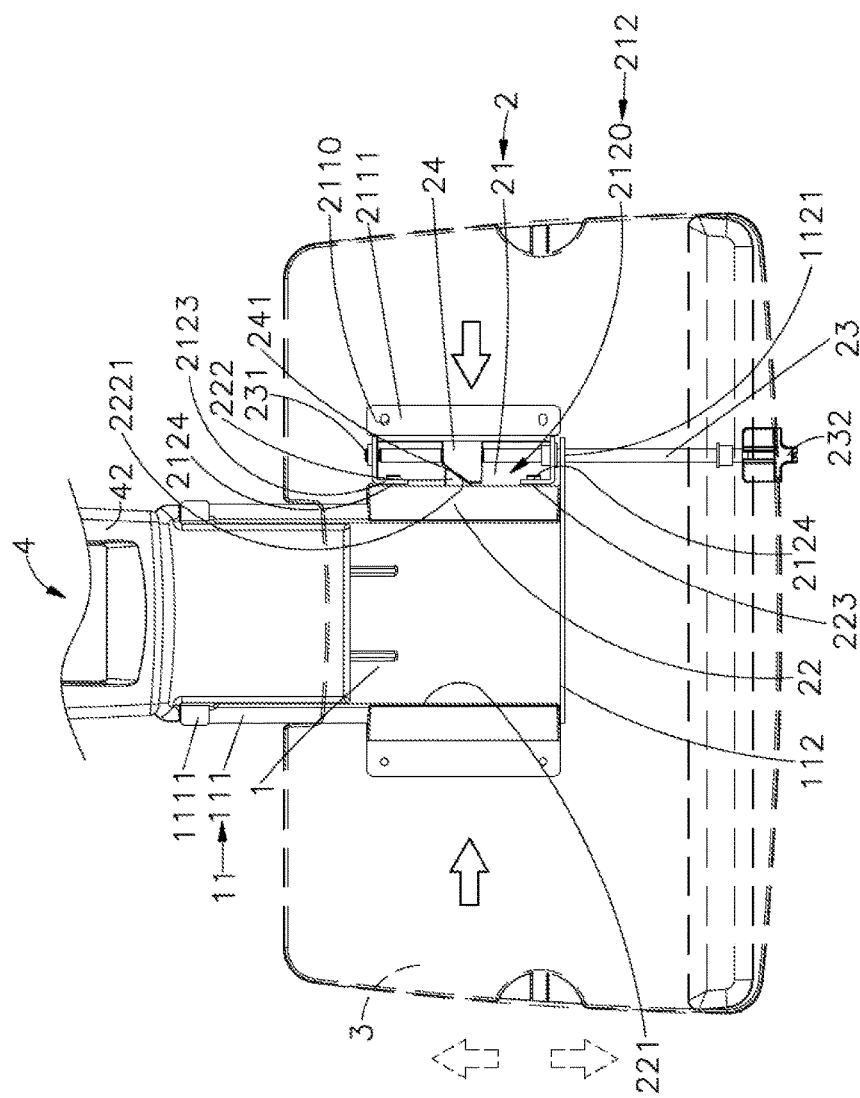
FIG. 9 is a schematic top view illustrating the pressure block abutted against the abutment block.

Referring to FIGS. 1-3, an adjustable desktop assembly in accordance with the present invention is shown. The adjustable desktop assembly comprises a base frame 1, an adjustment mechanism 2 and a desktop 3.

The base frame 1 comprises two sliding units 11 disposed at opposing left and right sides thereof, each sliding unit 11 comprising an inwardly tilted sliding plate 111 and a stop plate 1111 at a rear end of the inwardly tilted sliding plate 111, a front plate 112 located on a front side thereof, a first through hole 1121 located on one end of the front plate 112, and a mounting unit 12 located on an opposing rear side thereof that comprises two mounting plates 121 disposed at opposing left and right sides, a mounting through hole 1211 cut through each mounting plate 121 and a fastening member 122 mounted in each mounting through hole 1211.

The adjustment mechanism 2 comprises a sliding base 21 defining therein a sliding channel 210, two clamping plates 22, a lead screw 23, and a pressure block 24. The sliding base 21 comprises two opposing side panels 211 vertically disposed at two opposite lateral sides thereof, a locating panel 2111 perpendicularly outwardly extended from a top side of each side panel 211, a plurality of locating holes 2110 located on each locating panel 2111, a mounting screw 2112 mounted in each locating hole 2110, and an adjustment unit 212 located on one side panel 211. The adjustment unit 212 comprises an accommodation chamber 2120, a second through hole 2121 and a screw hole 2122 respectively located on opposing front and rear walls of the accommodation chamber 2120 and axially aligned in line, two locating lugs 2123 respectively disposed near the second through hole 2121 and the screw hole 2122 at an inner side, and a position-limiting hole 2124 cut through each locating lug 2123. The two clamping plates 22 are bilaterally mounted in the sliding channel 210 of the sliding base 21, each comprising a <-shaped clamping face 221 defined in an inner side thereof. One clamping plate 22 further comprises an abutment block 222 disposed opposite to the clamping face 221 and inserted into the accommodation chamber 2120 of the adjustment unit 212 and defining an abutment surface 2221 on opposing front and back sides thereof, and two position-limiting rods 223 disposed at opposing front and rear sides relative to the abutment block 222 and respectively engaged into the position-limiting holes 2124 on the locating lugs 2123. The lead screw 23 is rotatably mounted in the second through hole 2121 and screw hole 2122 of the adjustment unit 212, comprising an outer thread 231 extended around the periphery of one end thereof and threaded into the screw hole 2122 and a knob 232 located on an opposite end thereof for operation by the user to rotate the lead screw 23 clockwise or counter-clockwise. The pressure block 24 is fastened to the lead screw 23 and disposed in the accommodation chamber 2120 of the adjustment unit 212 for abutment against the abutment block 222, defining a beveled pressure surface 241 for abutment against the abutment surface 2221 of the abutment block 222.

The other side panel 211 of the sliding base 21 comprises a plurality of through holes 2113, and a plurality of screws 2114 respectively mounted in the through holes 2113 and threaded into respective mounting screw holes 224 on the other clamping plate 22 to affix the other clamping plate 22 to the other side panel 211 of the sliding base 21.

The desktop 3 comprises a bottom mount 31, and a plurality of fastening holes 311 located on the bottom mount 31.

The clamping face 221 of each clamping plate 22 is preferably <-shaped. However, this configuration is not a limitation. In another embodiment of the present invention, the clamping face 221 exhibits a single-beveled configuration. The clamping face 221 only needs to be complementary to the inwardly tilted sliding plate 111.

In installation, attach the sliding base 21 of the adjustment mechanism 2 to the bottom side of the base frame 1 to let the base frame 1 be received in the sliding channel 210 of the sliding base 21 and the sliding unit 11 of the base frame 1 be disposed between the two clamping plates 22 of the adjustment mechanism 2, then insert the lead screw 23 of the adjustment mechanism 2 properly through the first through hole 1121 of the front plate 112 and the second through hole 2121 of the adjustment unit 212 and drive the outer thread 231 of lead screw 23 into the screw hole 2122 of the adjustment unit 212. At this time, the pressure block 24 at the lead screw 23 is abutted against the abutment block 222 of the respective clamping plate 22. Thereafter, place the desktop 3 on the base frame 1 to aim the fastening hole 311 of the bottom mount 31 at the respective locating hole 2110 of the two side panels 211, and then drive the respective mounting screws 2112 through the respective locating holes 2110 into the respective fastening holes 311 to affix the desktop 3 to the sliding base 21 of the adjustment mechanism 2.

Referring to FIGS. 4-9, in application, the adjustable desktop assembly is installed in an external support frame assembly 4 that is designed for mounting to a table, a wall mount, or a wall. The external support frame assembly 4 comprises a bracket 41, a plurality of mounting holes 411 bilaterally located on the bracket 41, and an outer cover 42 covered on the bracket 41. In installation, the two mounting plates 121 of the mounting unit 12 of the base frame 1 are respectively attached onto two opposite lateral sides of the bracket 41 to aim the respective mounting through holes 1211 at the respective mounting holes 411 of the bracket 41, and then the fastening members 122 are respectively inserted through the respective mounting through holes 1211 and fastened to the respective mounting hole 411 to affix the mounting unit 12 of the base frame 1 to the bracket 41 of the external support frame assembly 4, and then the outer cover 42 is covered on the bracket 41 over the base frame 1. After installation of the base frame 1 in the external support frame assembly 4, the desktop 3 is suspended above the outer cover 42 of the external support frame assembly 4 for the placement of a notebook, keyboard, and other stationery accessories. Thus, when can work on the desktop 3 when watching the screen 5 that is supported on the external support frame assembly 4.

When the user needs to adjust the forward-backward position of the desktop 3 (for example, when changing a different size of screen 5), operate the knob 232 to rotate the lead screw 23 counter-clockwise and to further loosen the outer thread 231 of the lead screw 23 from the screw hole 2122 of the sliding base 21 of the adjustment mechanism 2. At the same time, the pressure block 24 is moved forwards with the lead screw 23 in direction away from the abutment block 222 of the clamping plate 22, thereby releasing the two clamping plates 22 from the sliding units 11 of the base frame 1. At this time, the user can use the two hands to move the desktop 3 forward or backward relative to the base frame 1 to the desired position. During forward or backward displacement of the desktop 3 relative to the base frame 1, the adjustment mechanism 2 is moved with the desktop 3, and the clamping plates 22 of the adjustment mechanism 2 are moved along the sliding units 11 of the base frame 1. However, since the inwardly tilted sliding plates 111 of the two sliding units 11 slope in one direction and the clamping faces 221 of the clamping plates 22 are <-shaped, when the clamping faces 221 of the clamping plates 22 are sliding on the inwardly tilted sliding plates 111 of the two sliding units 11, the clamping plates 22 are supported by the inwardly tilted sliding plates 111 in the vertical and horizontal directions, preventing deviation of the clamping plates 22, thus, the desktop 3 is constantly kept in balance during position adjustment.

When the desktop 3 is adjusted forwardly to the extent, the clamping plates 22 of the adjustment mechanism 2 are stopped by the inner surface of the front plate 112. On the contrary, when the desktop 3 is adjusted backwardly to the extent, the two clamping plates 22 of the adjustment mechanism 2 are stopped by the stop plates 1111 at the inwardly tilted sliding plate 111. Thus, the two clamping plates 22 can simply be moved forwards and backwards between the front plate 112 and the two stop plates 1111, preventing falling of the adjustment mechanism 2 out of the base frame 1.

After adjustment of the desktop 3 to the desired position, operate the knob 232 to rotate the lead screw 23 clockwise into the screw hole 2122. At this time, the pressure block 24 is moved backwardly with the lead screw 23, forcing the beveled pressure surface 241 of the pressure block 24 into abutment against the abutment surface 2221 of the abutment block 222 of the respective clamping plate 22. Since the abutment surface 2221 of the abutment block 222 and the beveled pressure surface 241 of the pressure block 24 are beveled and the abutment surface 2221 of the abutment block 222 is complementary to the beveled pressure surface 241, the pressure block 24 will push the abutment block 222 of the clamping plate 22 transversely during backward displacement of the pressure block 24, forcing the two clamping plates 22 to clamp the inwardly tilted sliding plates 111 of the sliding units 11, and thus, the desktop 3 is locked in the adjusted position.

As stated above, the abutment surface 2221 of the abutment block 222 and the beveled pressure surface 241 of the pressure block 24 are beveled, this design makes the mutual contact area larger in a fixed volume. Therefore, if the left and right alignment errors occur in the manufacturing process, the abutment block 222 can be reliably moved horizontally by the abutment surface 2221 and the beveled pressure surface 241 so as to allow more dimensional deviations. Further, since the abutment surface 2221 and the beveled pressure surface 241 are beveled, more wear between the abutment surface 2221 and the beveled pressure surface 241 can be tolerated without affecting normal functioning.

In conclusion, the invention has the advantages as follows:

1. When the lead screw 23 of the adjustment mechanism 2 is rotated forwardly or backwardly, the pressure block 24 is moved with the lead screw 23 to release the abutment block 222 of the clamping plate 22 for allowing adjustment of the position of the desktop 3, or to hold down the abutment block 222 of the clamping plate 22 in locking the desktop 3 by means of the clamping of the clamping plates 22 on the inwardly tilted sliding plates 111 of the sliding unit 11, achieving simple and rapid operation with less effort.

2. Subject to the complementary design between the inwardly tilted sliding plates 111 of the two sliding units 11 of the base frame 1 and the clamping faces 221 of the clamping plates 22 of the adjustment mechanism 2, the clamping plates 22 are supported by the inwardly tilted sliding plates 111 horizontally as well as vertically during sliding movement of the clamping faces 221 of the clamping plate 22 on the respective inwardly tilted sliding plate 111 of the sliding units 11 of the base frame 1, preventing deviation of the clamping plates 22 and keeping the desktop 3 constantly in balance during the forward or backward adjustment procedure.

3. The abutment surface 2221 of the abutment block 222 and the beveled pressure surface 241 of the pressure block 24 are beveled, this design tolerates more wear between the abutment surface 2221 and the beveled pressure surface 241, prolonging the overall lifespan of the adjustable desktop assembly.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. An adjustable desktop assembly, comprising:
a base frame comprising two sliding units disposed at opposing left and right sides thereof and a mounting unit located at a rear side thereof for mounting to an external support frame assembly, each said sliding unit comprising a sliding plate;
an adjustment mechanism comprising a sliding base mounted to said base frame and slidable forwards and backwards relative to said base frame, said sliding base comprising a sliding channel slidably coupled to said base frame, two side panels respectively upwardly extended from two opposite lateral sides thereof and an adjustment unit located on one said side panel and defining therein an accommodation chamber, two clamping plates bilaterally mounted in said sliding channel and adapted for clamping two sliding units of said base frame, each said clamping plate comprising a clamping face for clamping on the said sliding plate of one respective said sliding unit, one said clamping plate comprising an abutment block disposed opposite to the associating said clamping face and inserted into said accommodation chamber of said adjustment unit, a lead screw rotatably mounted in said adjustment unit and a pressure block fixedly mounted on said lead screw and movable with said lead screw between a locking position to hold down said abutment block and an unlocking position to release said abutment block; and a desktop comprising a bottom mount fastened to said sliding base;

wherein when rotating said lead screw of said adjustment mechanism in one direction, said pressure block is moved to said locking position to force said pressure block into abutment against said abutment block, causing said clamping plates to clamp said sliding plates of said sliding units of said base frame, on the contrary, when rotating said lead screw in the reversed direction, said pressure block is moved away from said abutment block, releasing said clamping plates from said sliding plates of said sliding units of said base frame and allowing movement of said desktop to carry said sliding base forward and backward relative to said base frame.

2. The adjustable desktop assembly as claimed in claim 1, wherein said sliding plates are inwardly tilted; said clamping faces of said two clamping plates are complementary to an inwardly tilted sliding plates of said sliding units.

3. The adjustable desktop assembly as claimed in claim 1, wherein each said sliding unit of said base frame further comprises a stop plate located at a rear end of the associating said sliding plate for stopping one respective said clamping plate.

4. The adjustable desktop assembly as claimed in claim 1, wherein said base frame further comprises a front plate located at an opposing front side thereof, and a first through hole located on one end of said front plate for the passing of said lead screw.

5. The adjustable desktop assembly as claimed in claim 1, wherein said mounting unit of said base frame comprises two mounting plates disposed at two opposite lateral sides, a mounting through hole cut through each said mounting plate, and a fastening member mounted in each said mounting through hole for fastening said mounting unit of said base frame to the external support frame assembly.

6. The adjustable desktop assembly as claimed in claim 1, wherein said bottom mount of said desktop comprises a plurality of fastening holes; said sliding base of said adjustment mechanism further comprises a locating panel perpendicularly outwardly extended from a top side of each said side panel, a plurality of locating holes located on each said locating panel, and a mounting screw mounted in each said locating hole and fastened to one respective said fastening hole of said bottom mount of said desktop to affix said sliding base to said desktop.

7. The adjustable desktop assembly as claimed in claim 1, wherein said sliding base of said adjustment mechanism comprises a plurality of through holes located on each said side panel and a screw hole mounted in each said through hole of said sliding base; each said clamping plate comprises a plurality of mounting screw holes respectively aimed at the said through holes of said sliding base for the fastening of the said screws of said sliding base.

8. The adjustable desktop assembly as claimed in claim 1, wherein said adjustment unit of said adjustment mechanism comprises a second through hole and the screw hole respectively located on opposing front and rear walls of said accommodation chamber for receiving said lead screw; said lead screw comprises a knob located on one end thereof and an outer thread extended around the periphery of an opposing end thereof for threading into the said screw hole of said adjustment unit.

9. The adjustable desktop assembly as claimed in claim 1, wherein said adjustment unit further comprises two locating lugs respectively extended from opposing front and rear sides thereof, and a position-limiting hole cut through each said locating lug; the said clamping plate comprising said abutment block further comprises two position-limiting rods respectively plugged into said position-limiting holes of said adjustment unit.

10. The adjustable desktop assembly as claimed in claim 1, wherein said abutment block of the respective said clamping plate defines an abutment surface on opposing front and back sides thereof; said pressure block defines a beveled pressure surface for abutment against said abutment surface of said abutment block.

* * * * *